Figure 1:
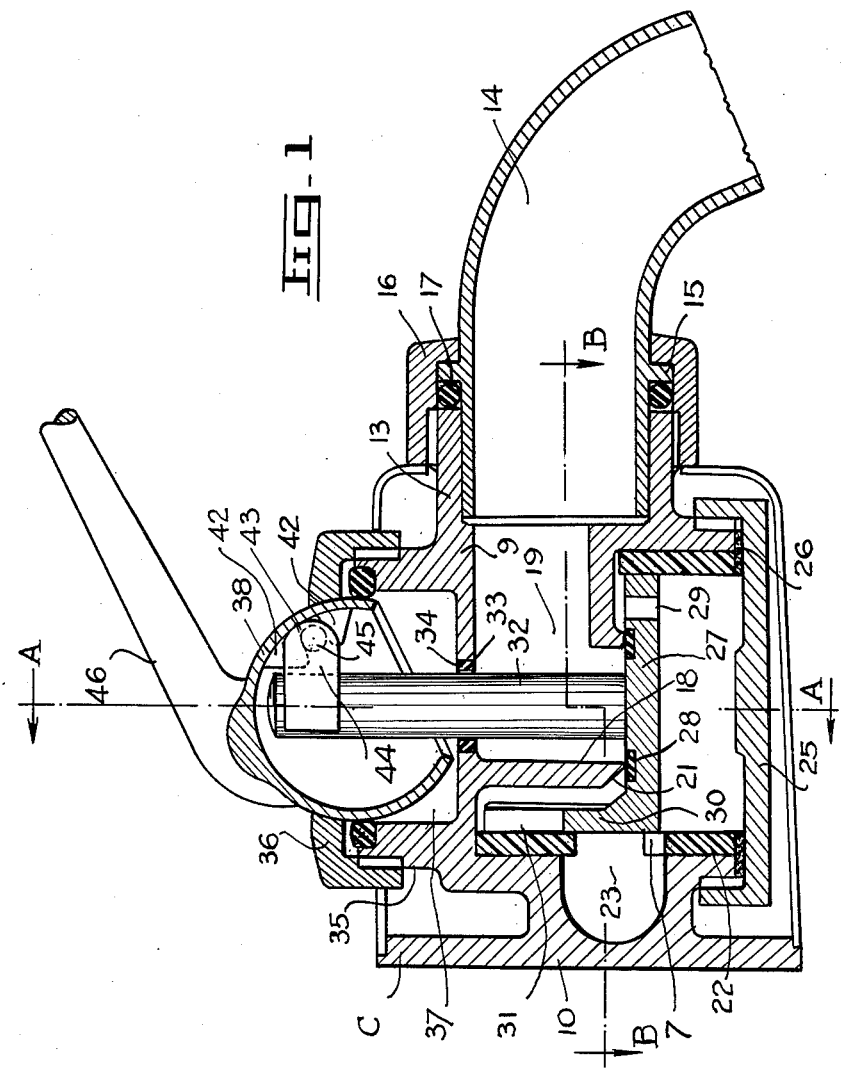

April 24, 1962

T. E. SWART 3,030,980

SINGLE HANDLE MIXER FAUCET

Filed July 15, 1958

2 Sheets-Sheet 1

INVENTOR
Tjebbe, Eduard, Swart.

Ralph Burch
ATTORNEY

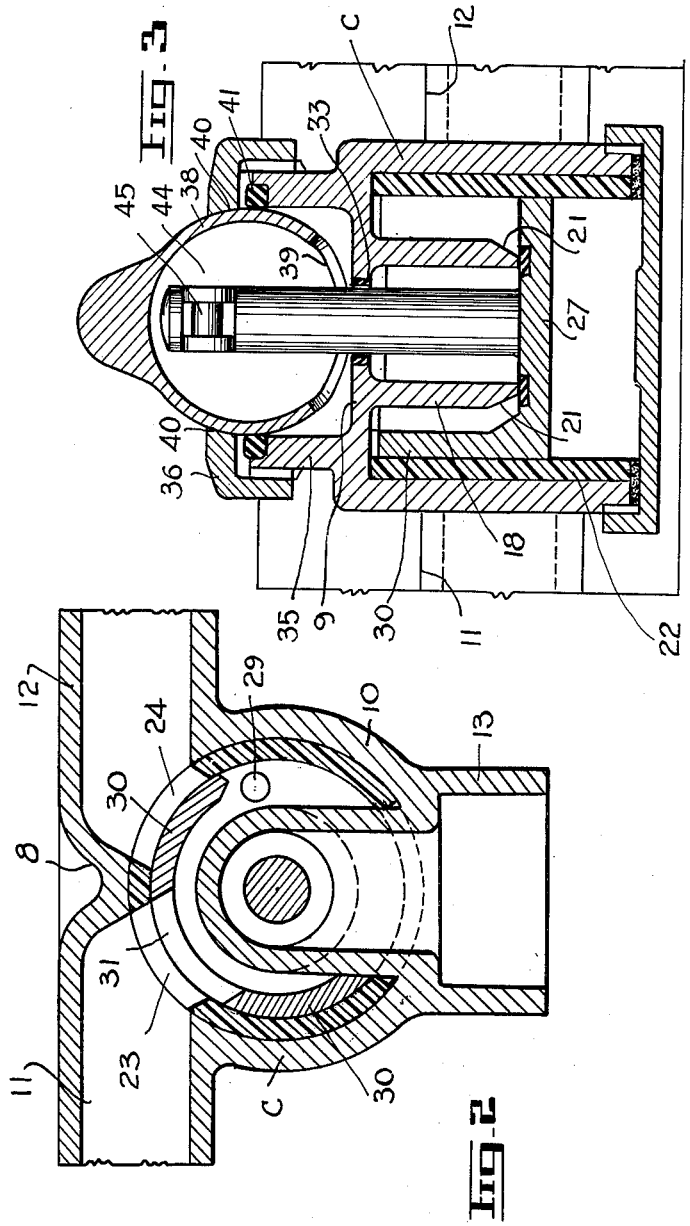

United States Patent Office 3,030,980
Patented Apr. 24, 1962

3,030,980
SINGLE HANDLE MIXER FAUCET
Tjebbe Eduard Swart, 2404 Lynn View Drive, Vancouver, British Columbia, Canada
Filed July 15, 1958, Ser. No. 748,689
4 Claims. (Cl. 137—625.17)

My invention relates to improvements in single handle mixing faucets adapted for domestic use, such as in household kitchens, bathrooms, etc., and in public buildings such as hotels, schools, etc.

Mixing faucet valves have been made heretofore, but have failed to provide a uniform mixture of hot and cold liquids in the desired proportions, and consequently the mixture obtained and the resulting temperature is such that it will not adequately meet the necessary domestic or other requirements.

Moreover the mixing faucets formerly constructed were difficult to adjust to meet the conditions required of them and frequently resulted in considerable loss of hot liquid before the desired balanced mixture of hot and cold liquid was obtained. The consequent loss of hot liquid increases the cost of heating and thus is not economical.

Friction between the movable members of such valves and the co-acting wall of the valve casing frequently cause uneven and detrimental wear to co-acting parts, resulting in misalignment of the parts and impairing the efficiency of the valve.

Further in the present day purification of water, various chemicals such as chlorine, fluorine, etc., are frequently used, and these chemicals react on the metallic part of the valve to the detriment thereof.

I have eliminated the above objections and have used to advantage an inner lining or sleeve fabricated from a plastic which is highly resistant to wear and possesses other qualities ideal for use in the manufacture of my valve.

One of the objects of my invention is to construct a mixing faucet operable by a single manually actuated handle to obtain a mixture or mixtures of hot and cold liquids in the desired proportions, and impart to the mixed liquids a desired temperature.

A further object of my invention is to provide a faucet which is of simple construction, strong and durable and capable of performing all the functions required of it.

Another object of my invention is to eliminate creeping of the actuating handle so that no lost motion arises on each movement of the handle, and a positive result is always obtained.

A further object of my invention is to provide a plastic sleeve within the valve casing with which the movable valve co-acts, the plastic being self lubricating, resilient, highly resistant to abrasion, capable of withstanding high temperatures and chemical reactions, thereby giving to the valve a longer life and higher efficiency.

Another object of my invention is to provide for the delivery of water below the under face of the movable piston of the valve when the valve is closed thereby pressing the piston upwardly into intimate engagement with the stationary upper member of the valve.

A further object still of my invention is to eliminate jarring during operation of the valve.

Other objects of my invention will be made clear as the specification proceeds.

So that the nature of my invention will be clearly understood, I have illustrated an embodiment of the same which I shall describe in detail, but I wish it to be understood that I do not limit my invention to this specific structure, but reserve the right to rearrange and modify the several elements of the structure within the scope of my appended claims and without departing from the spirit of my invention.

In the drawings:
FIGURE 1 is a sectional elevation of my single handle mixer faucet, and showing the outlet spout.
FIGURE 2 is a transverse section on the line B—B of FIGURE 1 looking in the direction of the arrows.
FIGURE 3 is a vertical section of the mixing faucet on the line A—A of FIGURE 1 and looking in the direction of the arrows.

Like characters of reference refer to like parts in the several FIGURES.

Referring to the drawings, C represents my improved mixing faucet comprising a cylindrical valve casing 10 of unitary structure and of suitable cast metal, formed at the rear with a pair of aligned conduits 11 and 12, which are designed to be operatively connected to cold and hot water pipes respectively, such as are provided in a household for domestic use.

The adjacent ends of the conduits 11 and 12 are separated by a vertically extending wall 8, so that liquid passing through these conduits is delivered radially towards the center of the valve casing 10.

On the front of the valve casing 10 a forwardly projecting conduit 13 is provided to which the water spout 14 is attached. The spout 14 is formed adjacent its inlet end with an integral radially extending annular collar 15 with which the packing nut 16 engages, and this nut makes threaded engagement with the conduit 13. A packing ring 17 is located between the collar 15 and the end of the conduit 13 to form a water tight joint.

A cylindrical valve member 18 is formed integral with and depends from the upper wall 9 of the valve casing 10 and is concentrically arranged around the vertical axis of the valve casing 10, and provided with a circumferential orifice 19 which communicates at 20 with the spout 14. The lower end of the cylindrical valve 18 is chamfered as shown at 21 in FIGURES 1 and 3.

The valve casing 10 is provided with a cylindrical sleeve 22 formed of a plastic material which is resilient, highly resistant to abrasion, capable of withstanding high temperatures and resistant to chemical action, besides which it is self lubricating. This sleeve is provided with ports 23 and 24 which communicate with the cold and hot water conduits 11 and 12 respectively, and the lower end of the valve casing 10 and the cylindrical sleeve 22 are closed by a cover 25 which makes threaded engagement with the outer peripheral wall of the valve casing 10.

There is a water tight joint 26 inserted between the lower ends of the cylindrical valve body 10, and the sleeve 22 with the cover 25. Slidably mounted in the sleeve 22 is a piston 27 provided on its upper face with a valve seat 28 with which the lower chamfered end 21 of the fixed cylindrical valve 18 co-acts.

It will be noted by reference to FIGURE 1 that one of the conduits 11 or 12 is so formed at its lower edge that a narrow arcuate opening 7 is provided which permits water under pressure to enter the space between the lower face of the piston 27 and the closure cover 25 when the valve is closed. This provides for a water pressure to be exerted upon the lower face of the piston 27 to press the piston upwardly and so insure a water tight closure between the piston and the fixed cylindrical valve.

The piston 27 is provided with small orifices 29 which extend therethrough to prevent a permanent water lock forming between the lower face of the piston and the cover 25, and the water collecting beneath the under face of the piston will act as a dash pot and eliminate any jarring action from taking place during the downward movement of the piston.

The piston is formed with an upwardly extending arcuate wall 30 which extends around a major portion of the periphery of the piston and is formed with a port 31 which co-acts with the port 23 in the sleeve 22. A mixing chamber is thus formed between the sleeve 22 and the outer peripheral wall of the fixed cylindrical valve 18.

The piston 27 is designed to be rotated in a clockwise direction, and the arcuate wall 30 will cover the port 23 and uncover or open the port 24 as shall be explained hereafter.

The piston 27 is designed to be manually reciprocated and rotated, and to this end it is provided with a spindle or piston rod 32 which slidably engages the orifice 33 in the upper wall 9 of the valve casing 10. It will be noted that in FIGURE 3 the piston rod 32 is in sliding engagement with the orifice 33 and in FIGURE 1 I have provided an alternative connection consisting of forming the orifice 33 larger than the diameter of the piston rod 32 and inserting a packing ring 34 of plastic material such as is above described between the inner periphery of the orifice 33 and the outer periphery of the piston rod 32.

On the upper wall of the casing 10 I provide an upwardly extending cylindrical wall 35 with which the flange retaining ring 36 makes threaded engagement thereby forming a chamber 37 within the cylindrical wall.

To facilitate manually reciprocating the piston 27 a hollow partial sphere 38 is provided which is formed on its lower periphery with an arcuate slot 39, and part of this hollow partial sphere extends into the chamber 37. The inner peripheral wall of the retaining ring 36 is arcuate in cross section as shown at 40, so that it intimately engages the outer peripheral wall of that part of the partial sphere with which it comes in contact.

A packing ring 41 is seated in the upper end of the cylindrical wall 35 and when the retaining ring 36 is tightened in position on the cylinder wall, then the major portion of the partial sphere is housed within the confines of the chamber 37. This connection between the partial sphere and the retaining ring simulates a ball and socket joint.

A pair of spaced lugs 42 are integrally formed on the inner face of the sphere, so that a recess 43 extends between the lugs. The upper part of the spindle or piston rod 32 extends through the arcuate orifice 39 into the interior of the partial sphere, and the upper end of the piston rod carries a sliding clamp from which a pair of spaced arms 44 project, and extending transversely across between these arms, a pin 45 is mounted.

This pin extends into the recess 43 and is embraced by the lugs 42, so that as the partial sphere 38 is rocked in a vertical plane, then a reciprocating movement is applied to the piston rod 32 to open and close the piston on the cylindrical valve 18 in the casing 10.

From the outer upper periphery of the partial sphere 38, a manually operable hand lever 46 extends, and the end of this lever may be formed integral with the sphere 38 or it may be welded thereto.

When my mixing faucet is installed with the conduits 11 and 12 operatively connected with the cold and warm water pipes in a building, then the mixing faucet is normally in the position shown in FIGURE 1 with the piston in elevated position with the chamfered end 21 of the cylindrical valve intimately engaging the valve seat 28 on the piston.

If it is desired to use the faucet, then the operator pushes the hand lever 46 downwardly thereby rocking the sphere 38 so that the lugs 42 which are in engagement with the pin 45 cause a movement to be transmitted to the piston rod 32 in a downward direction.

As the piston 27 is being pushed downwardly, then the passageway 7 is closed by the peripheral wall of the piston and the water in the space below the lower face of the piston 27 and the cover 25 is forced through the orifice 29 into the mixing chamber.

During the downward movement of the piston 27 the peripheral wall 30 uncovers the conduit 11 so that cold water passes into the valve chamber. The operator then rotates the hand lever 46 in an arc of a circle in a clockwise direction causing the peripheral flange 30 to uncover the port 24 and simultaneously another portion of the flange 30 partially covers the port 23 so that streams of hot and cold water are delivered into the mixing chamber of the faucet and mixed therein. The operator rotates the hand lever to the required extent to obtain the mixture of hot and cold water at any desired temperature.

To shut off the water the operator rotates the hand lever 46 in a counter clockwise direction and then pulls the hand lever upwardly, whereupon the piston will return to the normally closed position shown in FIGURE 1. Any water which has collected below the piston 27, and is forced up through the orifices 29 into the mixing chamber formed between the sleeve and the fixed cylindrical valve 18, commingles with the water being delivered under the valve 18 to the mixing chamber.

This movement of the piston permits water to flow from the conduit 11 through the ports 23 and 31 and pass around the outer wall of the valve member 18 into the interior of the valve member and so to the spout 14.

The cold and hot water delivered to the mixing chamber between the sleeve 22 and the cylindrical valve 18, commingle and intimately mix, and the mixture is delivered under the chamfered lower end 21 of the cylinder valve 18 to pass through the port 19 to the spout 14.

By rotating the piston 27 to a greater extent, then the cold water port 23 may be closed to any desired extent, and simultaneously the hot water port 24 is further opened, so that a warmer mixture of cold and hot water is obtained. It will be clear that any desired temperature of a mixture of cold and hot water ordinarily used for household purposes may thus be obtained.

It will be clear that the operation of this mixing faucet is extremely simple and can be accurately manipulated to obtain a delivery of water of any desired temperature, and this mixing faucet is reliable in operation and there are no structural parts which are liable to go out of repair.

Changes or modifications in the form of related parts will be apparent to those skilled in the art, and such changes may be made without departing from the spirit and scope of the invention as defined in the following claims.

I claim:

1. A mixing faucet comprising a casing having top and bottom walls, a vertical plastic sleeve mounted in said casing having a pair of inlet ports through its wall, hot and cold water conduits connected to said casing in register with the ports of said sleeve, a tubular valve member depending from the top wall of said casing centrally of said sleeve having a lateral port extending through said sleeve, said tubular valve member terminating above the bottom wall of said casing, a discharge spout connected to the lateral port of said tubular valve member, a piston rotatably and reciprocably mounted in said sleeve below the lower end of said tubular valve member, a valve seat on the upper end of said piston for engagement with the lower end of said tubular valve member upon upward movement of said piston, the lower end of said piston being spaced from the bottom wall of said casing in uncovering relation to an inlet port of said sleeve when the piston is raised thereby allowing water to enter the casing below the piston, an arcuate vertical wall surrounding a portion of the periphery of said piston in covering relation to the inlet ports of said sleeve, said arcuate wall having a port for register with said inlet ports upon rotation and reciprocation of said piston to admit water to the mixing chamber above said piston, a port through said piston establishing communication between the space below said piston and the mixing chamber above said piston allowing the water below said piston to flow into the mixing chamber above the piston when said piston moves downwardly to an open position, and means for rotating and reciprocating said piston.

2. A mixing faucet comprising a casing having top and bottom walls, water conduits connected to the side wall of said casing, a sleeve vertically disposed in said casing between the top and bottom walls having inlet openings in its wall in register with the water conduits, a discharge conduit vertically disposed in said casing having its inlet end disposed above the bottom wall of the casing and its outlet end extending through the side wall of said casing, a piston valve mounted in said sleeve below the inlet end of said discharge conduit forming a mixing chamber above the piston, said piston having an arcuate wall surrounding the periphery of said piston provided with a port for register with the ports of said sleeve, a valve seat on the upper face of said piston valve for seating engagement with the inlet end of said discharge conduit, said piston valve being spaced from the bottom wall of said casing in uncovering relation to an inlet opening of said sleeve to admit water into the space beneath said piston valve when the piston valve is in closed position, a port through said piston valve to establish communication between the space beneath said piston valve and the mixing chamber to allow the water below said piston valve to flow into said mixing chamber above the piston valve when said piston valve moves downwardly to an open position, a piston rod extending upwardly from said piston through the discharge conduit and top wall of said casing, a wall surrounding the upper end of said piston rod, a retaining ring mounted on the upper end of said wall, a partial spherical member pivotally connected to the upper end of said piston rod, said member being rotatably and rockably mounted in said retaining ring, and a handle connected to said member for actuating said member to reciprocate and rotate said piston to control the flow of water into and from said casing.

3. A mixing faucet as described in claim 2 in which said spherical member is provided with a pair of lugs on its inner wall and the upper end of said piston rod is provided with spaced arms supporting a pin having pivotal connection with said lugs.

4. A mixing faucet comprising a cylindrical casing, hot and cold water conduits connected to the wall of said casing and communicating with the interior of said casing, a discharge conduit disposed vertically in the center of said casing with its inlet end in spaced relation to the bottom of said casing and having an outlet port extending through the wall of said casing, a piston valve mounted in said casing below the inlet end of said discharge conduit, said piston valve having an upstanding flange around a portion of its periphery having a port adapted to register with said water conduits to admit water to the mixing chamber above said piston, a valve seat on the upper face of said piston valve for sealing engagement with the inlet end of said discharge conduit, said piston valve being disposed in uncovering relation to one of said conduits when in closed position to admit water beneath said piston valve, a port through said piston valve to establish communication between the space below said piston valve and the mixing chamber to allow water below said piston valve to flow into the mixing chamber above said piston valve when the piston valve moves downwardly to open position, a piston rod extending from said piston valve axially of said discharge conduit and through the top of said casing, a partial spherical member mounted on the upper end of said piston rod, means pivotally connecting said spherical member to said piston rod, a retaining ring surrounding said spherical member mounted on said casing, said ring having a bearing seat rotatably and rockably mounting said spherical member, and a handle attached to said spherical member operable to rock and rotate said member to reciprocate and rotate said piston valve.

References Cited in the file of this patent
UNITED STATES PATENTS

| | | |
|---|---|---|
| 781,525 | Isaacs | Jan. 31, 1905 |
| 1,428,826 | Bittel | Sept. 12, 1922 |
| 1,693,758 | Hennessey | Dec. 4, 1928 |
| 2,503,881 | Manis | Apr. 11, 1950 |
| 2,609,206 | Moen | Sept. 2, 1952 |
| 2,713,987 | Schenk | July 26, 1955 |
| 2,751,930 | Redner | June 26, 1956 |
| 2,757,687 | Moen | Aug. 7, 1956 |
| 2,800,923 | Russell | July 30, 1957 |